United States Patent [19]

Citron et al.

[11] Patent Number: 4,843,870
[45] Date of Patent: Jul. 4, 1989

[54] CYLINDER-BY-CYLINDER ENGINE PRESSURE AND PRESSURE TORQUE WAVEFORM DETERMINATION UTILIZING CRANKSHAFT SPEED FLUCTUATIONS

[75] Inventors: Stephen J. Citron, West Lafayette, Ind.; John E. O'Higgins, Stuttgart, Fed. Rep. of Germany

[73] Assignee: Purdue Research Foundation, West Lafayette, Ind.

[21] Appl. No.: 224,548

[22] Filed: Jul. 25, 1988

[51] Int. Cl.[4] ............................................. G01M 15/00
[52] U.S. Cl. ........................................ 73/116; 73/660
[58] Field of Search ................... 73/117.3, 660, 116; 123/478, 625; 364/566

[56] References Cited
U.S. PATENT DOCUMENTS

3,657,922  4/1972  Sibeud ................................. 73/117.3
4,581,923  4/1986  Nitao et al. ............................. 73/116

Primary Examiner—Jerry W. Myracle
Attorney, Agent, or Firm—Barnes & Thornburg

[57] ABSTRACT

An elastic model of the engine-drivetrain system is proposed. Measured crankshaft speed fluctuation data is developed and computations are made from the model to determine the fluctuation waveform of both the total engine torque being developed and the engine pressure torque. Utilizing the engine pressure torque fluctuation waveform, the mean level of engine torque being developed is obtained, thus providing the full engine pressure torque waveform. Finally, the engine pressure torque waveform is used to obtain the cylinder pressure waveform which gave rise to it. Knowledge of these torques and of the cylinder pressure provides the basis for both open loop and adaptive engine control strategies.

14 Claims, 10 Drawing Sheets

CYLINDER-BY-CYLINDER ENGINE PRESSURE AND PRESSURE TORQUE WAVEFORM DETERMINATION UTILIZING CRANKSHAFT SPEED FLUCTUATIONS

Various techniques are known for determining the relative torque productions of the cylinders of a multiple cylinder internal combustion engine and for using those relative torque contributions in controlling engine performance. There are, for example, the systems described in U.S. Pat. Nos. 4,532,592 and 4,697,561. The former of these patents describes a system in which crankshaft speed at a selected point near top dead center in the compression/combustion transition of each cylinder is used to determine the relative torque contributions of the discrete combustion events. These relative torque contributions are then used to control, for example, ignition timing in a spark-ignited engine, or a fuel distribution parameter, such as fuel distribution timing or amount of fuel, in a compression-ignited engine. This teaching can be extended to provide a technique for monitoring engine roughness at idle and implemented in an idle controller.

In the latter of these patents, it was discovered that the correlation between crankshaft speed at or near top dead center of the compression/combustion transition of each cylinder and torque contribution by that cylinder is not perfect for all engines under all circumstances. That patent described a more broadly applicable technique for ascertaining the individual torque productions of the individual combustion events. This finding permitted a control strategy having broader applicability in terms of the variety of engines and engine operating conditions it was capable of controlling.

Figure 1A:
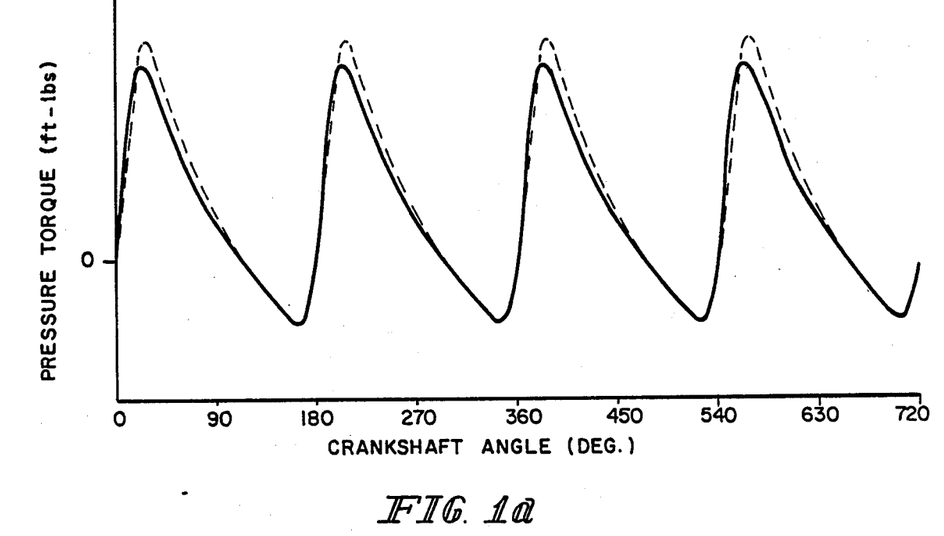
FIG. 1a illustrates engine pressure torque in foot-pounds versus crankshaft angle at 1500 rpm (solid line) and 2600 rpm (broken line) for a four cylinder engine.
Figure 1B:
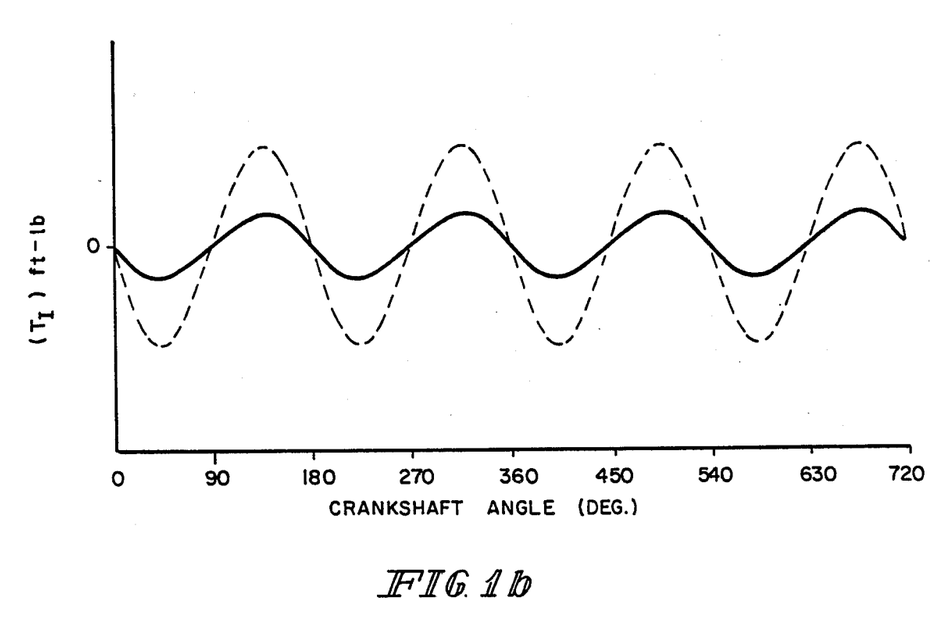
Figure 1C:
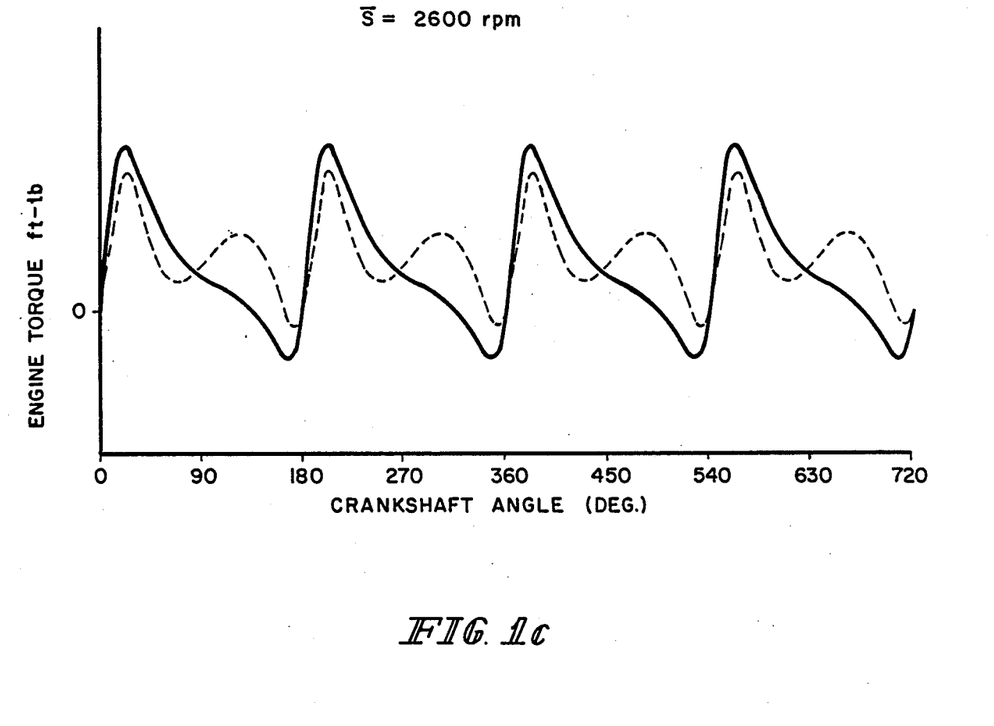
FIG. 1c illustrates total engine torque in foot-pounds versus crankshaft angle at 1500 rpm (solid line) and 2600 rpm (broken line) for the engine of Figs. 1a–b.

It now appears that there are engine operating conditions which fall outside the control ranges of the control strategies heretofore developed. Existing control strategies of the type just discussed cannot effectively control engines which are experiencing these operating conditions. Just why this is so has been attributed to the nature of engine torque and to the fact that the engine is coupled to its load by elastic members and is itself an elastic assembly Engine torque has two components, an inertial component, which can be calculated mathematically using a well known formula, and a pressure torque, that torque which results when the pressure caused in the individual cylinder by the individual combustion event acts through the piston and connecting rod on the crankshaft. It will be immediately appreciated that what is of interest in determining and controlling the performances of cylinders, that is, the "quality" of individual combustion events, is directly related to this pressure torque, but bears essentially no relationship to the inertial component of torque. If inertial torque were constant, the fact that it was present in the quantity being measured to determine combustion event performance would not cause any problems. Its impact could simply be subtracted from engine torque to arrive at the pressure component. However, the inertial torque varies with the same frequency as the pressure torque. In addition, the inertial component varies as the square of crankshaft rotation rate, so that, while its effect may not be so great at low rotation rates, that effect becomes greater and greater with increasing rpm, so that inertial torque may dominate in total engine torque at high rotation rates. In addition, the two components of total engine torque tend to move in opposite directions, as can best be seen in FIG. 1a, an illustrative graph of pressure torque from two successive cylinder firings versus crankshaft angle, FIG. 1b, an illustrative graph of inertial torque versus the same crankshaft angle, and FIG. 1c an illustrative graph of total engine torque versus the same crankshaft angle. The solid lines illustrate typical low rotation rate values for these components. The broken lines illustrate typical higher rotation rate values for these components. The vertical axes are in foot-pounds, but are not necessarily to the same scale.

In each of U.S. Pat. Nos. 4,532,592 and 4,697,561, engine crankshaft speed at a particular instant or crank angle was associated with the torque production from a combustion event in a particular cylinder. The present disclosure recognizes that crankshaft speed at a measurement point depends not only on the current combustion event, but also on the vibrational response of the system to which the engine is coupled to previous combustion events. Therefore, to determine the characteristics of the current combustion event, a method must be devised to decouple the effects of the current combustion event from the system vibrational response.

According to one aspect of the invention, engine pressure torque is reconstructed, and from it, the cylinder pressure which gave rise to it. The cylinder pressure waveform reconstruction provides a technique to implement engine control strategies requiring knowledge of cylinder pressure. The disclosed technique eliminates the need for expensive in-cylinder pressure measurement instrumentation. The disclosed technique also eliminates the need to sense cylinder pressure through engine block surface-mounted strain gauges or vibration gauges.

According to one aspect of the invention, a method is provided for producing a signal related to the fluctuation of the pressure component of the torque, or the mean engine torque, or the engine pressure torque, or the cylinder pressure produced by an internal combustion engine. The method comprises the steps of measuring the rate of rotation of an engine component, generating a first signal related thereto, determining the inertial component of the torque produced by the engine, generating a second signal related thereto, and combining the first and second signals to provide the desired signal.

According to another aspect of the invention, a method is provided for producing a signal related to the fluctuation of the pressure component of the torque, or the mean engine torque, or the engine pressure torque, or the cylinder pressure, produced by an internal combustion engine. The method comprises the steps of measuring the rate of rotation of a driven component to which the engine is coupled, generating a first signal related thereto, determining the inertial component of the torque produced by the engine, generating a second signal related thereto, and combining the first and second signals to provide the desired signal.

According to yet another aspect of the invention, a method is provided for generating a signal related to the fluctuation of the pressure component of the torque, or the mean engine torque, or the engine pressure torque, or the cylinder pressure produced by an internal combustion engine coupled through a drivetrain to a load. The method comprises the steps of determining the rate of rotation of a component of the engine-drivetrain-load combination, generating a first signal related thereto, determining the inertial component of the torque produced by the engine, generating a second signal related thereto, and combining the first and second signals to provide the desired signal.

Illustratively according to this aspect of the invention, the engine-drivetrain-load combination comprises an engine vibration damper. The step of determining the rate of rotation of a component of the engine-drivetrain-load combination comprises the step of determining the rate of rotation of the engine vibration damper.

Alternatively according to this aspect of the invention, the step of determining the rate of rotation of a component of the engine-drivetrain-load combination comprises the step of determining the rate of rotation of the crankshaft at the engine.

According to another alterative embodiment of this aspect of the invention, the step of determining the rate of rotation of a component of the engine-drivetrain-load combination comprises the step of determining the rate of rotation of the engine's flywheel.

Illustratively according to this embodiment, the step of determining the rate of rotation of the flywheel comprises the steps of generating clock pulses at a uniform frequency and counting the number of such clock pulses between passage of adjacent teeth of the flywheel's ring gear past a fixed point.

According to yet another embodiment, the step of determining the rate of rotation of a component of the engine-drivetrain-load combination comprises the step of determining the rate of rotation at the load.

As used herein, the term "load" refers to those drivetrain components which appear in the system behind the flywheel. This definition does not ignore frictional load. In the model presented in the illustrative embodiment, however, frictional load simply is divided between the engine and those drivetrain components which appear in the system behind the flywheel Further illustratively according to this aspect of the invention, the load is characterized by a load torque which fluctuates on the same general time scale as the engine torque. The method further comprises the steps of determining the rate of rotation of a second component of the engine-drivetrain-load combination and generating a third signal related to the load torque therefrom Illustratively according to this embodiment, the engine-drivetrain-load combination comprises an engine vibration damper and the step of determining the rate of rotation of a second component of the engine-drivetrain-load combination comprises the step of determining the rate of rotation of the engine vibration damper.

Alternatively, illustratively according to this embodiment, the step of determining the rate of rotation of a second component of the engine-drivetrain-load combination comprises the step of determining the rate of rotation of the crankshaft at the engine.

According to another alternative of this embodiment, the step of determining the rate of rotation of a second component of the engine-drivetrain-load combination comprises the step of determining the rate of rotation of the engine's flywheel. Illustratively, this comprises the steps of generating clock pulses at a uniform frequency and counting the number of such clock pulses between passage of adjacent teeth of the flywheel ring gear past a fixed point.

According to yet another alternative of this embodiment, the step of determining the rate of rotation of a second component of the engine-drivetrain-load combination comprises the step of determining the rate of rotation at the load.

The invention may best be understood by referring to the following detailed description of an illustrative embodiment of the invention and the accompanying drawings. In the drawings:

1 FIG. 1b illustrates engine inertial torque in foot-pounds versus crankshaft angle at 1500 rpm (solid line) and 2600 rpm (broken line) for the engine of FIG. 1a;

In order to promote a more thorough understanding of the invention, a four degrees of freedom model illustrative of the engine-drivetrain system will first be presented. A more complex model may be used if greater accuracy is required. Alternatively, a simpler model may suffice for some applications.

Figure 1D:
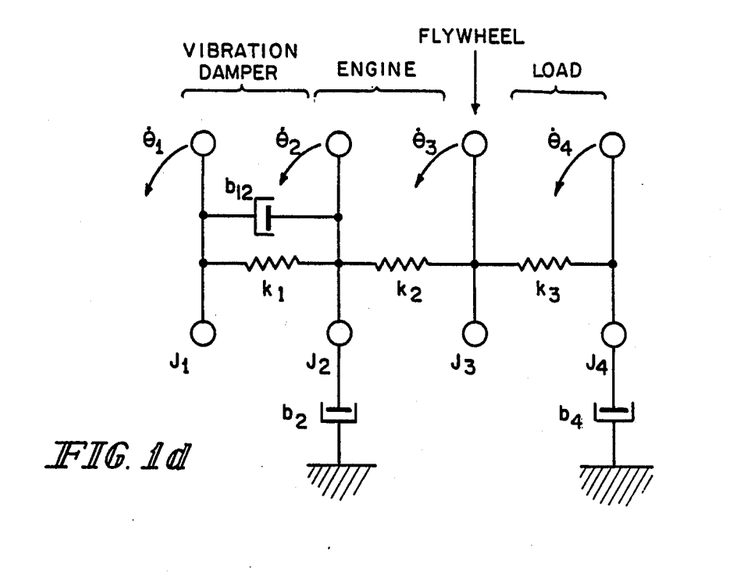
FIG. 1d illustrates in a highly schematic diagram format a model of an engine-drivetrain-load combination of a vehicle.

The four inertias used in developing the four degrees of freedom model are: (1) the vibration damper; (2) the engine, including the crankshaft and the connecting rods; (3) the flywheel; and most importantly, (4) the vehicle inertia itself. Three torsional springs join these inertias. They are, respectively: (1) the shaft between the vibration damper and engine; (2) the crankshaft between engine and flywheel; and finally, (3) the shaft(s) linking flywheel to vehicle inertia. A schematic diagram of this simple model is illustrated in FIG. 1d. This model includes certain damping. Additional damping may be included in more complex models as appropriate.

The equations governing the motion of the four degrees of freedom model illustrated in FIG. 1d provide the means to reconstruct the engine torque fluctuation waveform from the speed fluctuation data. The engine pressure torque fluctuation waveform can then be found by subtracting the engine inertial torque from the engine torque utilizing well-known relations giving inertial torque as a function of crank angle, crankshaft speed and engine geometry. Utilizing the mean engine torque determined from the pressure torque fluctuation waveform, the engine pressure torque waveform may be formed, from which the cylinder pressure waveform is determined.

Equating the torques on each inertia yields the four equations of motion that follow:

$$J_1\ddot{\theta}_1 + b_{12}(\dot{\theta}_1 - \dot{\theta}_2) + k_1(\theta_1 - \theta_2) = 0 \quad (1)$$

$$J_2\ddot{\theta}_2 + b_{12}(\dot{\theta}_2 - \dot{\theta}_1) + b_2\dot{\theta}_2 + k_1(\theta_2 - \theta_1) + k_2(\theta_2 - \theta_3) = T_E \quad (2)$$

$$J_3\ddot{\theta}_3 + k_2(\theta_3 - \theta_2) + k_3(\theta_3 - \theta_4) = 0 \quad (3)$$

$$J_4\ddot{\theta}_4 + b_4\dot{\theta}_4 + k_3(\theta_4 - \theta_3) = -T_L \quad (4)$$

where $T_E$ and $T_L$ are the engine torque and drivetrain load torque, respectively It can be assumed that the engine torque, input at the engine (inertia $J_2$), and the load torque, input at inertia $J_4$, may be represented by terms of the form $$T_E = T_e e^{j\omega t} \quad (5)$$

$$T_L = T_l e^{j\omega t} \quad (6)$$

Ignoring the initial condition response which dies away, the solution for the resulting angular displacement of the $i^{th}$ inertia is then of the form $$\theta_i = A_i e^{j\omega t} \quad (7)$$

Differentiating twice yields the following expressions for the corresponding angular velocity and acceleration:

$$\dot{\theta}_i = j\omega A_i e^{j\omega t} = B_i e^{j\omega t}, \quad (8)$$

where $B_i = j\omega A_i$, and $$\ddot{\theta}_i = -\omega^2 A_i e^{j\omega t} \quad (9)$$

Substituting these relations into the four equations of motion, equations 1–4, and expressing the result in matrix form yields the matrix equation, $$[R]\{\theta\} = \{T\} \quad (10)$$

where
[R] = = System matrix from equations of motion,
$\{\theta\}$ = Angular displacement amplitude vector, and
$\{T\}$ = Forcing torque amplitude vector.
The matrix [R] is, $$\begin{bmatrix} -\omega^2 J_1 + k_1 + j\omega b_{12} & -k_1 - j\omega b_{12} & 0 & 0 \\ -k_1 - j\omega b_{12} & -\omega^2 J_2 + k_1 + k_2 + j\omega(b_2 + b_{12}) & -k_2 & 0 \\ 0 & -k_2 & -\omega^2 J_3 + k_2 + k_3 & -k_3 \\ 0 & 0 & -k_3 & -\omega^2 J_4 + k_3 + j\omega b_4 \end{bmatrix} \quad (11)$$

while the displacement amplitude vector, $\{\theta\}$, and the torque amplitude vector, $\{T\}$, are $$\theta = \begin{Bmatrix} A_1 \\ A_2 \\ A_3 \\ A_4 \end{Bmatrix} \quad T = \begin{Bmatrix} T_1 \\ T_2 \\ T_3 \\ T_4 \end{Bmatrix} = \begin{Bmatrix} 0 \\ T_e \\ 0 \\ -T_l \end{Bmatrix} \quad (12)$$

These equations describe the response of the four degree of freedom engine-drivetrain system to a single frequency input. In fact, however, engine torque is composed of an infinite number of frequency components. The drivetrain load may be also. Therefore, in order to predict the response of the system, its input must be modelled as having many frequencies.

By means of Fourier decomposition, it is possible to represent the engine torque as a series of sine waves as follows, $$T_E(t) = \overline{T}_E + \sum_{m=1}^{n} (T_{E,m}\sin(\omega_m t + \phi_{T_m})) \quad (13)$$

where the subscript m denotes the $m^{th}$ Fourier component, $\overline{T}_E$ denotes the mean engine torque, and $\phi_{T_m}$ is the phase of the $m^{th}$ engine torque component. A comparable analysis applies to the drivetrain load torque.

The overall response of the system to the applied torque is the superposition of all of the responses to all of the torque components in the input. Thus the angular speed at the flywheel is given by, $$\theta_3(t) = \overline{\theta}_3 + \sum_{m=1}^{n} \theta_{3,m}\sin(\omega_m t + \phi_{3,m}) \quad (14)$$

where $\phi_{3,m}$ is the phase at the third inertia due to the $m^{th}$ harmonic It is known that average angular velocity in a given angular interval can be obtained by counting clock pulses occurring during the time interval between, for example, two adjacent teeth on a gear or two adjacent marks on a position encoder, as they move past a fixed reference point. The number of clock counts obtained is inversely proportional to the average angular velocity over the interval. Thus $$\theta_3(t) = \frac{k_{cc}}{cc_3(t)}, \tag{15}$$

where $k_{cc}$ is a system constant and $cc_3(t)$ is the number of clock counts between the adjacent teeth or marks for the third inertia.

An underlying assumption in the prior art has been that the amplitude of the clock counts waveform is inversely proportional to the mean engine pressure torque across the range of engine speeds of interest. If that were true, knowledge of engine speed and count amplitude alone would be enough to give a measure of mean engine pressure torque.

Figure 3:
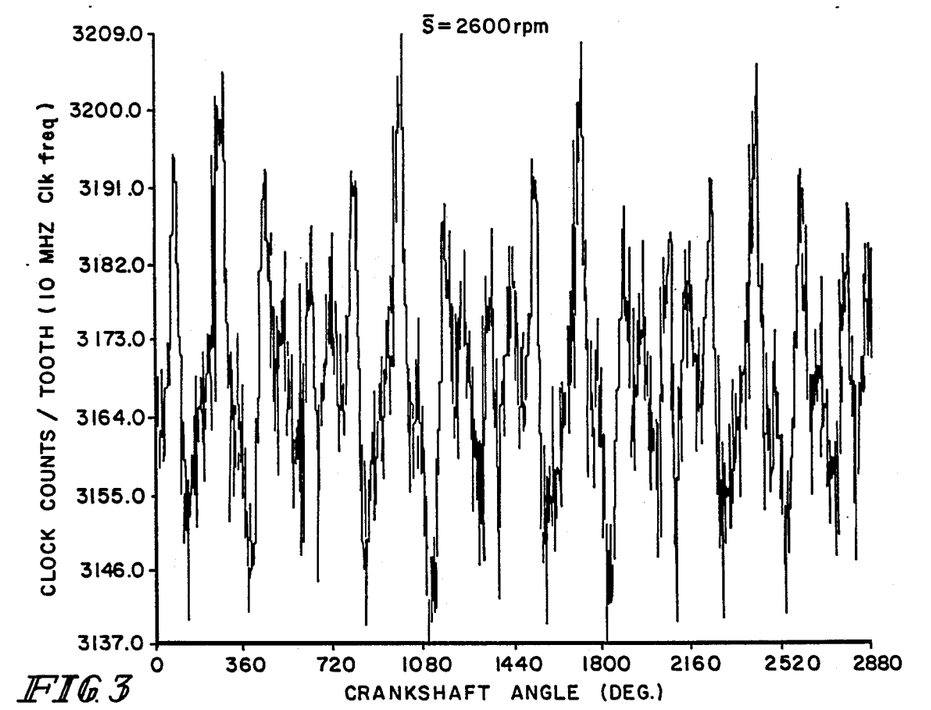
FIG. 3 illustrates clock counts of the 10 MHz clock received per tooth of the 142 tooth flywheel ring gear versus crankshaft angle at 2600 rpm.
Figure 6:
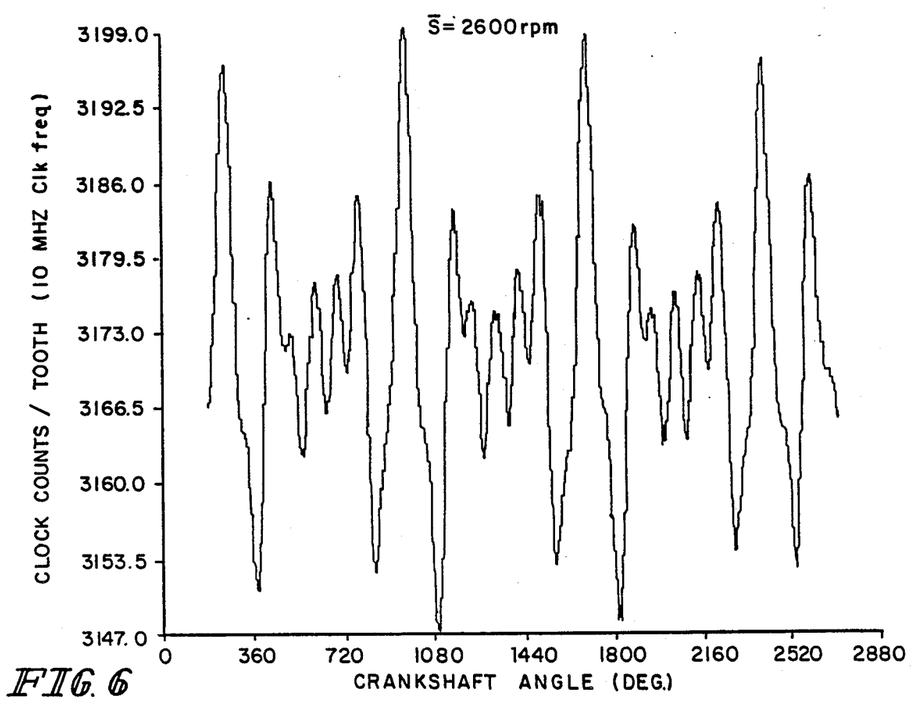
FIG. 6 illustrates filtered clock counts of the 10 MHz clock received per tooth of the 142 tooth flywheel ring gear versus crankshaft angle at 2600 rpm.

Experimental and theoretical results confirm, however, that difficulties exist using this assumption. For some engines, the assumption is not supported at certain speeds because of the effect of inertial torques. In addition, for some engine-drivetrain combinations, system vibrational characteristics distort the simple firing frequency response. FIGS. 3 and 6 need only be consulted to verify the invalidity of the assumption. FIGS. 3 and 6, the unfiltered and filtered clock count waveforms at 2600 rpm, display many more relative maxima and minima per crankshaft revolution (360 degrees) than the two that would be expected for a four cylinder, four-stroke cycle engine. As will be discussed in greater detail, this complex waveform illustrates the interplay of the forcing torques $T_E$ and $T_L$ with the vibrational system coupling the engine to its load.

Figure 2:
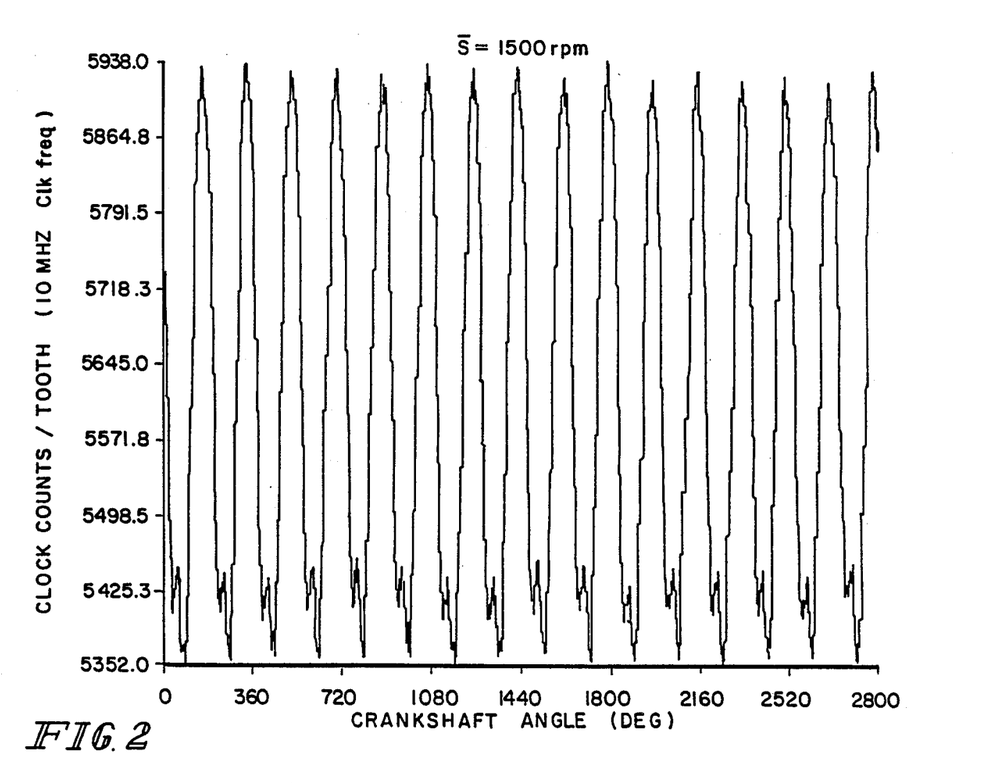
FIG. 2 illustrates clock counts of a 10 MHz clock received per tooth of a 142 tooth flywheel ring gear versus crankshaft angle at 1500 rpm.
Figure 4:
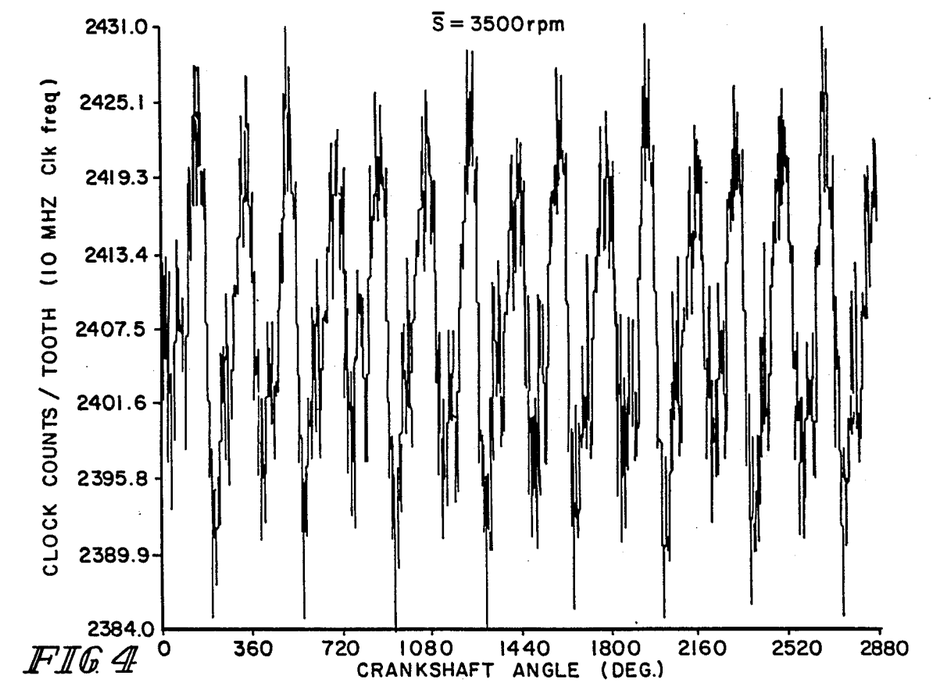
FIG. 4 illustrates clock counts of the 10 MHz clock received per tooth of the 142 tooth flywheel ring gear versus crankshaft angle at 3500 rpm.

FIGS. 2-4 illustrate actual raw data as it would appear to the engine computer for a four cylinder engine connected to a dynamometer representing the drivetrain load torque and inertia. This data illustrates the types of clock count waveforms actually encountered. This data was obtained using a magnetic pickup from the 142 tooth flywheel ring gear at engine speeds of 1500 rpm, 2600 rpm and 3500 rpm. Of course, data of this kind can also be collected at the front of the engine, for example, from the vibration damper, using an encoder provided on the vibration damper. In cases where load fluctuation is of sufficient significance to be included in an analysis, data must be collected at two stations, for example, on the flywheel ring gear and on the drive shaft to the vehicle wheels.

Clock count waveforms are the basic input required for the scheme herein presented for determining the torque fluctuation waveform. The clock count data of FIGS. 2-4 may be filtered digitally by the computer yielding the waveforms illustrated in FIGS. 5-7, respectively, although this may not always be necessary.

As previously noted, once the total engine torque fluctuation is known, the engine pressure torque fluctuation is determined by subtracting the mathematically determined engine inertial torque from the total engine torque fluctuation waveform. The engine inertial torque $T_I$ can be represented with great accuracy as follows:

$$T_I = -[M^* \ddot{y} * r(\theta)] \tag{15a}$$

where $$\ddot{y} = g_1 \left[ \cos\theta + g_2 \frac{\cos 2\theta}{g_3} + g_2^3 \frac{(\sin 2\theta)^2}{g_3^3} \right]$$

$$g_1 = \frac{\text{stroke}}{2} \left[ \frac{S\pi}{30} \right]^2$$

$$g_2 = \frac{\text{stroke}}{\text{connecting rod length}}$$

$$g_3 = [1 - (g_2 \sin\theta)^2]^{\frac{1}{2}}$$

S = crankshaft speed at engine (rpm)
M = effective mass of piston, connecting rod and crank assembly
$r(\theta)$ = torque radius $$r(\theta) = \frac{\text{stroke}}{2} \sin\theta + \frac{f_1 \cos\theta}{\sqrt{(1 - f_1^2)}} \tag{15b}$$

where $f_1 = \frac{\text{stroke}}{2\ lc} \sin\theta$ $lc$ = connecting rod length respect to TDC of the power stoke The technique uses knowledge of the system vibrational characteristics and the known system outputs, the clock counts variations at the measurement points, to calculate the system inputs, the engine and load torques required to generate the known system outputs.

The model of the four degree of freedom vibrational system developed previously, Equations 10-12, is repeated here for convenience $$[R]\{\theta\} = \{T\} \tag{10}$$

where
[R] = system matrix from equations of motion,
$\{\theta\}$ = Angular displacement amplitude vector, and
$\{T\}$ = Forcing torque amplitude vector.

If the engine torque $T_E$ were known, it could be decomposed into its Fourier components and the resulting angular displacement amplitude calculated for each torque component. These torque components then would directly provide the corresponding angular displacement amplitudes from Equation 10 and then velocity amplitudes from Equation 8. The sum of these responses along with the response to the drivetrain load torque $T_L$ obtained by the same process would give the total system angular speed response. As noted, the clock count waveform at any station is proportional to the inverse of this quantity According to the present invention, this problem is solved in reverse. That is, given clock count waveforms measured at an appropriate number of stations, the engine torque fluctuations are calculated, and, should it be desired, the load torque fluctuations that gave rise to the clock count waveforms are also calculated.

First, let the case wherein the drivetrain load torque is essentially constant over the engine torque expansion interval be considered. Under this condition, the engine torque fluctuation waveform is the only external input driving the angular velocity fluctuations.

Equation 10 can then be rewritten as Equation 16 by solving for $\theta$, $$[R]^{-1} \{T\} = \{\theta\} \quad (16)$$

or $[r] \{T\} = \{\theta\}$ where $[r] = [R]^{-1}$ The system might now be viewed as having as its input the displacement amplitude vector $\{\theta\}$ or, through the use of Equation 8, the velocity amplitude vector $\{\dot{\theta}\}$, and as its output the torque amplitude vector $\{T\}$. The angular velocity at the flywheel inertia, calculated from the counts waveform measured at the flywheel, Equation 15, is known.

Since the drivetrain load torque $T_L$ has been assumed to be constant over the engine firing interval, $T_2$, that is $T_e$, the engine torque amplitude, is the only fluctuating non-zero element of the torque vector. An expansion of Equation 16 relating the fluctuating inputs and outputs thus gives four equations of the form, $$r_{i,2}*T_2 = A_i, \text{ or } r_{i,2}*T_e = A_i \quad (17)$$

where $r_{i,2}$ is the $r^{th}$ row, $2^{nd}$ column element of the inverse system matrix $[r]$ and $A_i$ is the amplitude of the angular displacement at the $i_{th}$ inertia, see Equation 7. For the measurement station at the flywheel, $i=3$. Using the engine torque representation of Equation 13, at the forcing frequency $\omega_m$ Equation 17 becomes $$r_{3,2}*T_{E,m} = A_{3,m} \quad (18)$$

or, $$T_{E,m} = \frac{A_{3,m}}{r_{3,2}} = \frac{B_{3,m}}{j\omega_m} * \frac{1}{r_{3,2}}$$

where $T_{E,m}$ is the amplitude of the engine torque component associated with frequency $\omega_m$, $r_{3,2}$ is evaluated at the same frequency and $A_{3,m}$ and $B_{3,m}$ are the amplitudes of the angular displacement and angular velocity responses, respectively, at the flywheel at frequency $\omega_m$, see Equation 8.

Alternatively if count data is obtained from the engine's vibration damper, station 1, then, $$T_{E,m} = \frac{A_{1,m}}{r_{1,2}} = \frac{B_{1,m}}{j\omega_m} * \frac{1}{r_{1,2}} \quad (19)$$

Suppose now that fluctuations in the load torque do occur on the same time scale as the engine firings In this case there are two driving torque fluctuations, the engine torque fluctuation and the load torque fluctuation. To solve for the engine torque fluctuation components in this case, the only modification required in the above procedure is to measure the angular velocity (clock counts), at two stations. For example, if measurements were taken at stations 3 and 4, that is, on the flywheel and on the drive shaft at the load point, Equation 16 would give two equations to solve for the two unknowns, $T_2 = T_{E,m}$ and $T_4 = -T_{L,m}$.

The procedure described above is illustrated below using clock count data collected at the flywheel assuming the load torque is constant over the firing interval. Using the clock counts from the flywheel, $cc_3(t)$, $$\dot{\theta}_3(t) = \frac{k_{cc}}{cc_3(t)}$$

A Fourier decomposition of the speed waveform then gives, $$\theta_3(t) = \bar{\theta}_3 + \sum_{m=1}^{n} \theta_{3,m}\sin(\omega_m t + \phi_{3,m}) \quad (20)$$

System parameters are determined off-line, as are the functional relation with frequency of the amplitude and phase of the required component of the system inverse matrix $[r]$, in this case $r_{3,2}$. The required relationships are then stored by the vehicle's on-board computer for use in real time.

The total engine torque wave, excluding the mean, is shown below, $$\overline{T}_E - T_E = \sum_{m=1}^{n} T_{E,m}\sin(\omega_m t + \phi_{Tm}) \quad (21)$$

The amplitude of each engine torque harmonic, $T_{E,m}$, is given by, $$T_{E,m} = \frac{\theta_{3,m}}{\omega_m} * \frac{1}{|r_{3,2}|} \quad (22)$$

The phase of each engine torque component is determined from, $$\phi_{Tm} = \phi_{3,m} + \Psi_{3,m} - \frac{\pi}{2} \quad (23)$$

where;
$\phi_{3,m}$ = Original phase of speed component, and
$\Psi_{3,m}$ = System phase shift, (negative of the phase of $r_{3,2}$).

the $\pi/2$ factor arises from the relation between speed and displacement.

The desired pressure torque fluctuations are obtained by subtracting the inertial torque fluctuations from the total torque fluctuations given above. As previously noted, the crankshaft speed at the engine is required to calculate the inertial torque. Assume for the moment that this speed is not measured and must be obtained from the model.

The engine speed is made up of a mean value and fluctuating components. For the mean value, a representation of the mean speed from the measurement stations is employed, since the mean shaft speed must be essentially the same at all stations if the shaft is not to "wind up". The fluctuating components of the engine speed may be determined from the system model by using the now known engine torque in Equation 16.

Alternatively, if the system is stiff enough, it may be possible to use the flywheel speed in place of the engine speed in finding the inertial torque. As another alternative, provision may even be made for measuring the engine shaft speed, thus avoiding the difficulty by taking the engine shaft speed measurement directly from the engine. Thus, it may not be necessary to make an engine speed measurement in order to obtain the engine speed.

Figure 5:
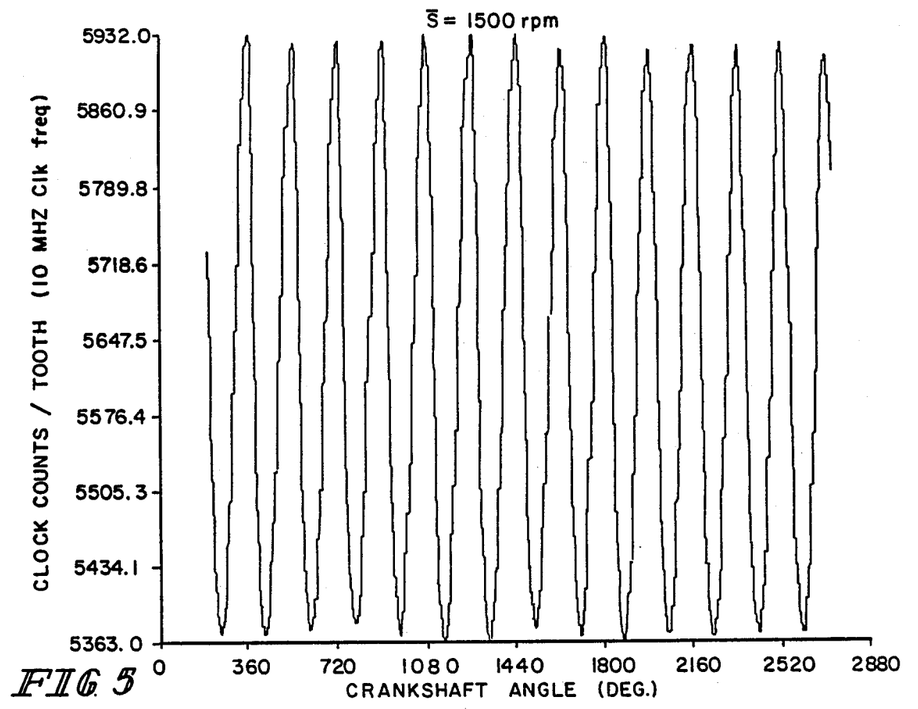
FIG. 5 illustrates filtered clock counts of the 10 MHz clock received per tooth of the 142 tooth flywheel ring gear versus crankshaft angle at 1500 rpm.
Figure 7:
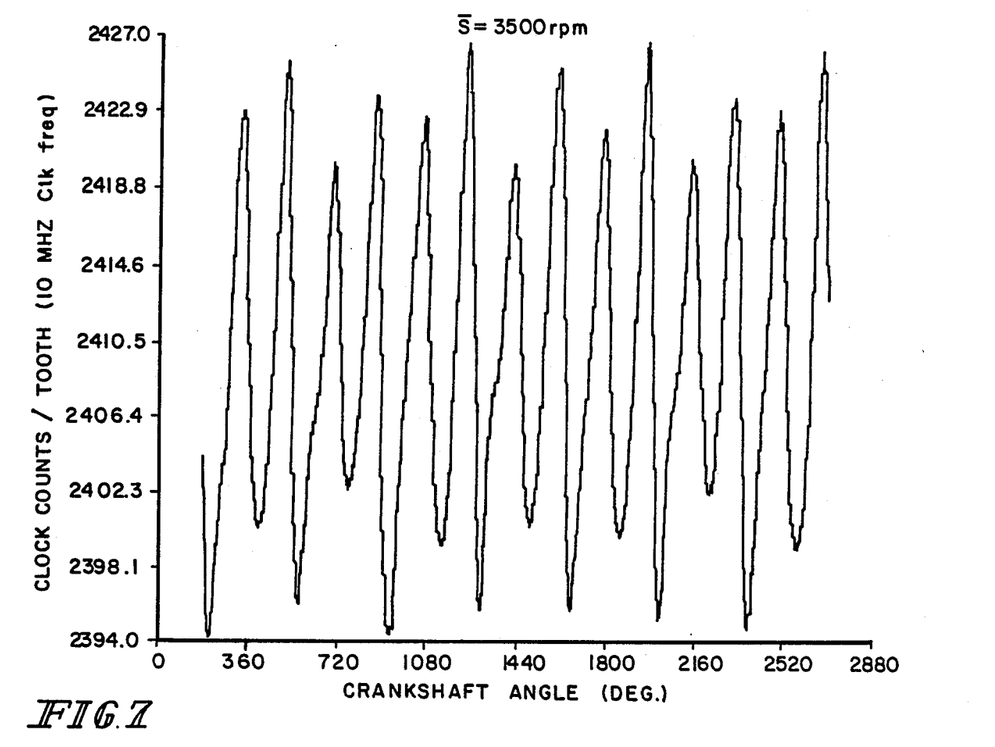
FIG. 7 illustrates filtered clock counts of the 10 MHz clock received per tooth of the 142 tooth flywheel ring gear versus crankshaft angle at 3500 rpm.
Figure 8:
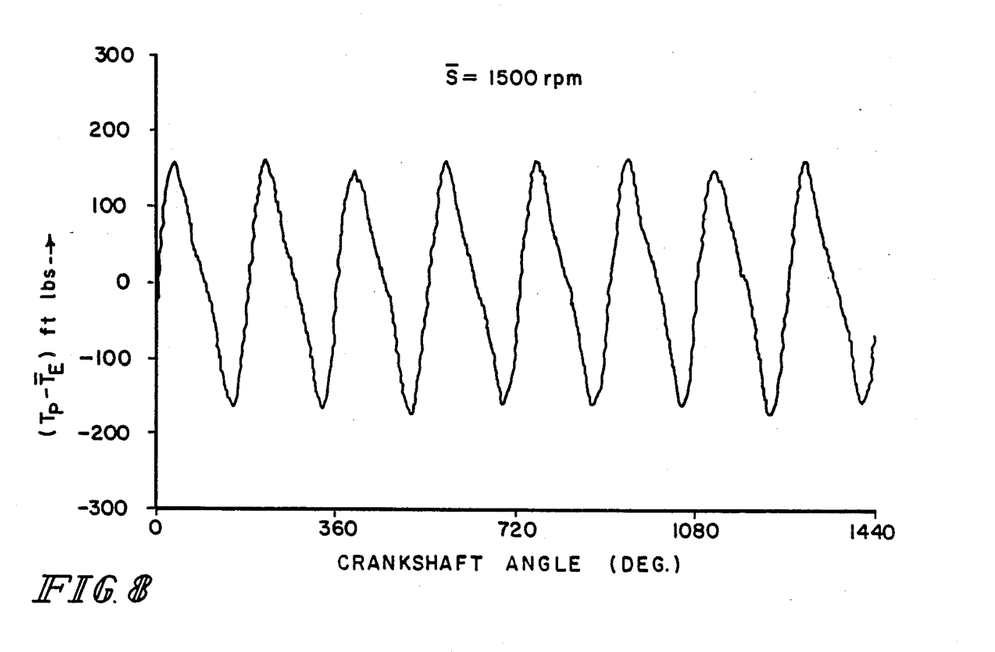
FIG. 8 illustrates engine pressure torque minus mean engine torque in foot-pounds, reconstructed using a 180 degree fast Fourier transform (FFT) window, versus crankshaft angle at 1500 rpm.

Using the filtered clock count data presented previously in FIGS. 5-7, the technique outlined above was used to reconstruct the corresponding engine pressure torque fluctuation waveforms. The results are illustrated in Figs. 8-10, respectively.

Figure 9:
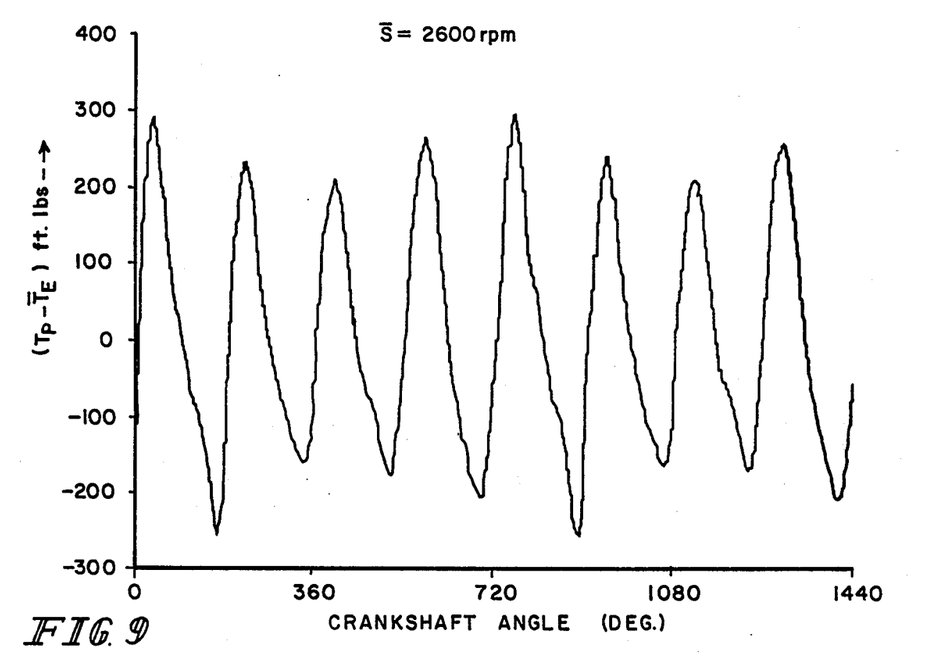
FIG. 9 illustrates engine pressure torque minus mean engine torque in foot-pounds, reconstructed using a 180 degree FFT window, versus crankshaft angle at 2600 rpm.
Figure 10:
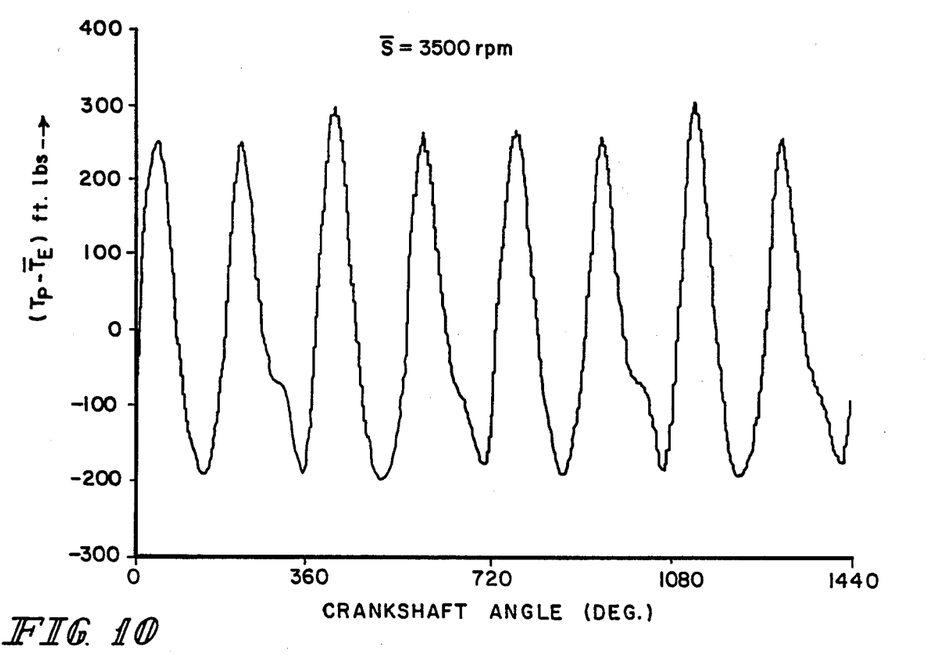
FIG. 10 illustrates engine pressure torque minus mean engine torque in foot-pounds, reconstructed using a 180 degree FFT window, versus crankshaft angle at 3500 rpm.

Particular note should be made of the pressure torque fluctuation reconstruction at 2600 rpm, FIG. 9, in light of the complexity of the corresponding clock count waveform, FIG. 6.

Figure 11:
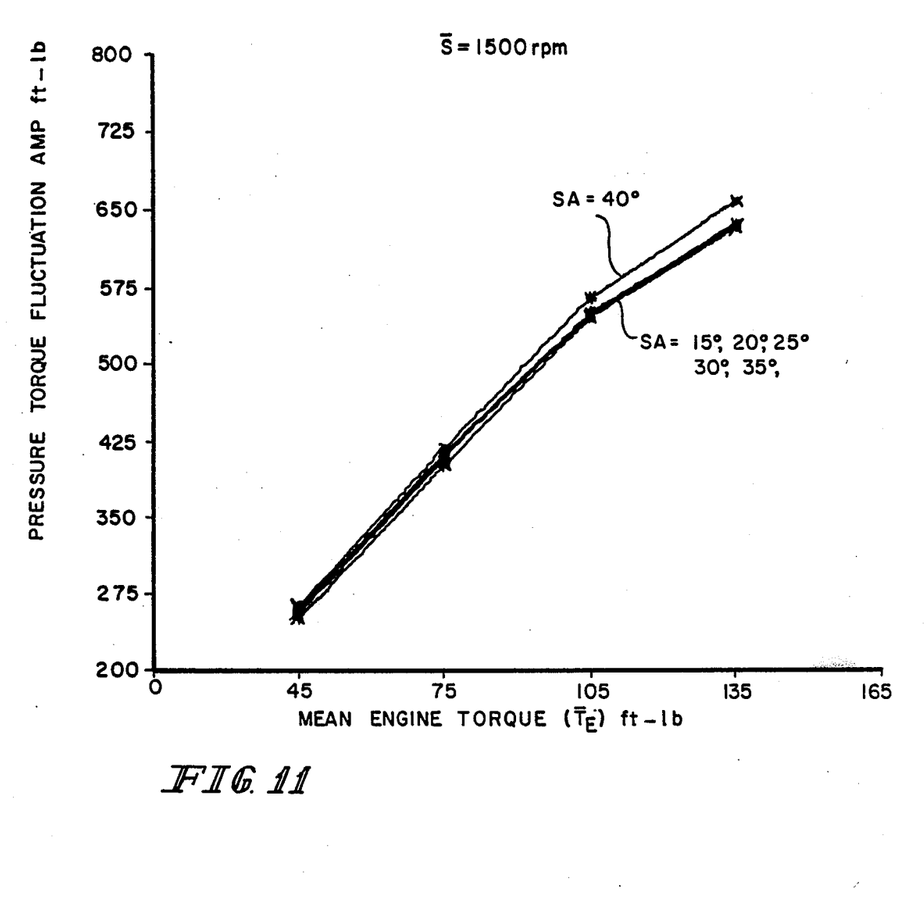
FIG. 11 illustrates pressure torque fluctuation amplitude in foot-pounds versus mean engine torque in foot-pounds at an average of 1500 rpm.

FIG. 11 illustrates one means of utilizing the pressure torque fluctuation waveform as just determined to obtain the mean pressure torque produced by the engine. In FIG. 11, the amplitude of the pressure torque fluctuation is plotted against mean engine torque over a range of spark advances from 15 to 40 degrees BTDC at 1500 rpm. Thus, given the computed pressure torque fluctuation waveform and knowledge of the existing spark advance, the mean value of the engine pressure torque produced may be found using stored relations of the type illustrated in FIG. 11.

Figure 12:
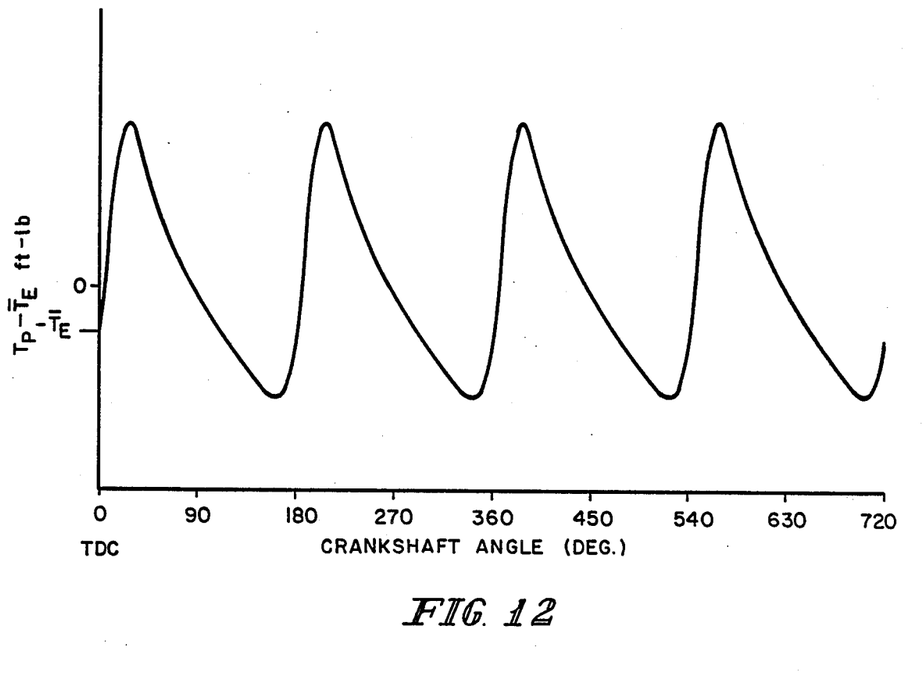
FIG. 12 illustrates pressure torque minus mean engine torque in foot-pounds, reconstructed using a 180 degree FFT window, versus crankshaft angle.

Alternatively, the mean level of the engine pressure torque (which is the same as the mean level of the total engine torque since the inertial torque has a mean value of zero) may be found by reference to FIG. 12. In FIG. 12 the reconstructed engine pressure torque fluctuation, $T_P - \overline{T}_E$ is plotted versus crankshaft angle starting with the angle of zero corresponding to top dead center, TDC, at the start of the power stroke. Note that the value for the pressure torque fluctuation is not zero at TDC.

Recall also that since the torque radius is zero at TDC, the pressure torque must be zero there. It therefore follows that the value of $\overline{T}_E$ must be just that value shown in FIG. 12 at TDC since adding this value to $T_P - \overline{T}_E$ produces $T_P$ with the required With the pressure torque waveform $T_P(\theta)$, now known, the pressure waveform that gave rise to it may be determined. With great accuracy in the vicinity of the peak pressure, the cylinder pressure of the cylinder undergoing the power stroke may be determined by assuming that the total pressure torque is being generated by that cylinder Thus $$P(\theta) = T_P(\theta) * \frac{1}{r(\theta)*A}$$

where $r(\theta)$ is the torque radius as a function of crank angle of the cylinder in the power stroke and A is the effective piston area. This relation is used in turn for the pressure in each cylinder for a symmetric angle before and after TDC equal to half of the firing angle. For a 4 cylinder engine this corresponds to 90°, while for 6 and 8 cylinder engines the range on either side of TDC would be 60° and 45°, respectively The relation between torque radius, crank angle and engine parameters is well known and given by Equation 15b.

Figure 13:
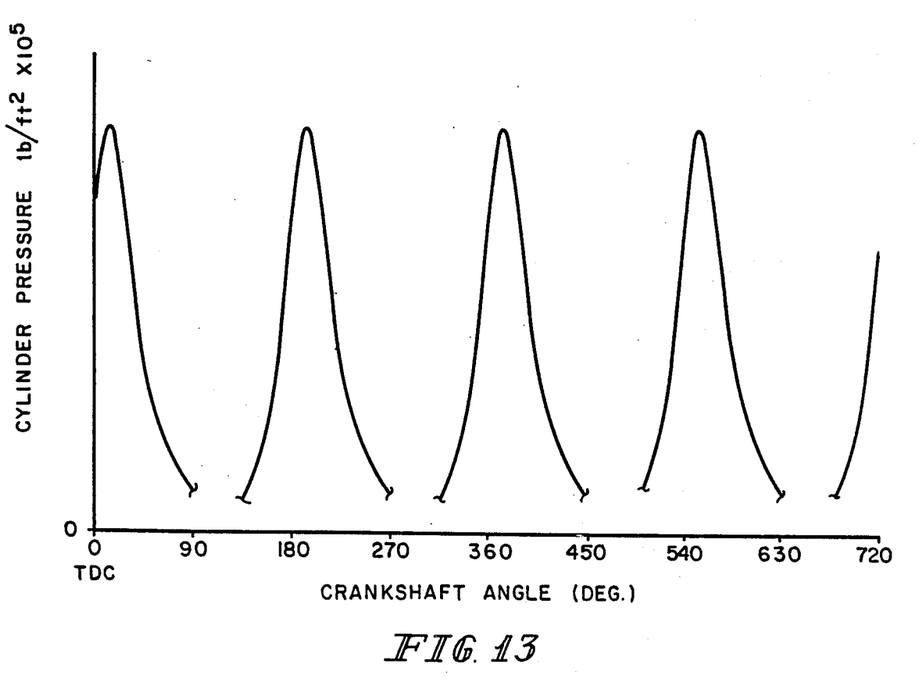
FIG. 13 illustrates cylinder pressure in pounds per square foot times $10^5$, reconstructed using a 180 degree FFT window, versus crankshaft angle.

For the 4 cylinder engine used for illustration here, the reconstructed cylinder pressure waveform is shown in FIG. 13.

Figure 14:
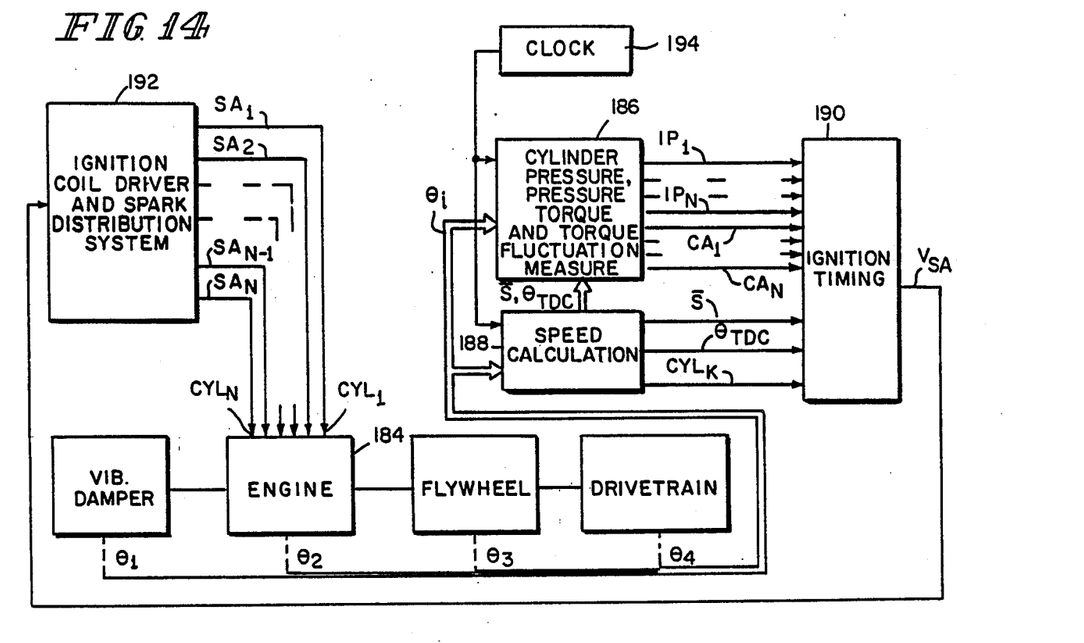
FIG. 14 illustrates a block diagram of a system for controlling the performance of a multiple cylinder internal combustion engine according to the present invention; and, FIG. 15 illustrates a block diagram of a system for controlling the performance of a multiple cylinder internal combustion engine according to the present invention.

A block diagram illustration of a control system implemented on a spark ignition engine and used to set ignition timing is shown in FIG. 14. Implementations in which fuel delivery balance is controlled follow directly. The crankshaft angular positions $\theta_1 - \theta_4$ are used by a cylinder pressure, pressure torque and torque fluctuation (relative combustion efficiency) measure calculation system 186 to derive both a pressure torque measure ($CA_k$) and pressure torque fluctuation (relative combustion efficiency) measure ($IP_k$) for each cylinder in engine 184. A speed calculation system 188 uses the crankshaft angular positions $\theta_1 - \theta_4$ to calculate the mean engine speed, $\overline{S}$, to generate a reference to top dead center, $\theta_{TDCk}$ and to index the cylinder position in the firing order, $CYL_k$. An ignition timing system 190 determines the optimum spark advance for each cylinder based on the pressure torque measure ($CA_k$) and the relative combustion efficiency measure ($IP_k$) from system 186 and the mean engine speed $\overline{S}$ from system 188. The cylinder index, $CYL_k$, mean engine speed, $\overline{S}$, and top dead center reference $\theta_{TDCk}$, are used to time the ignition signal, $V_{Sak}$, transmitted to the ignition coil driver and spark distribution system 192 to assure the proper spark advance to each cylinder of engine 184. A clock 194 generates the time base for the time-dependent functions of systems 186, 188.

Figure 15:
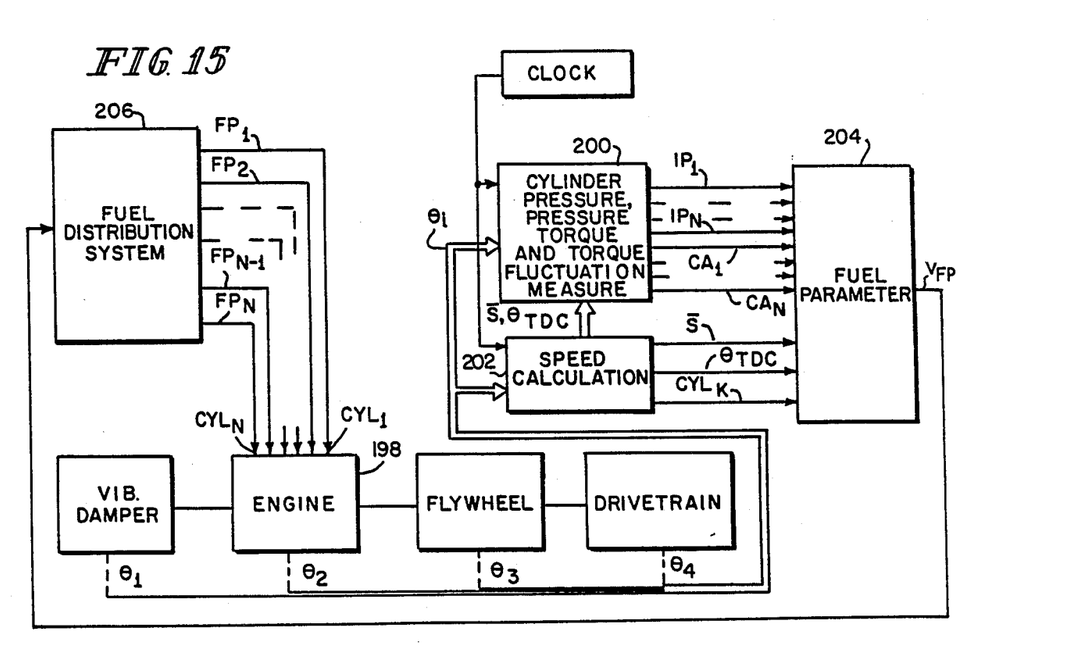

The implementation of this control on a spark or compression ignition engine is illustrated in FIG. 15. In this application, the fuel injection timing, $FP_k$, to each cylinder, $CYL_k$, is the controlled variable. The crankshaft angular positions $\theta_1 - \theta_4$ are used by a cylinder pressure, pressure torque and pressure torque fluctuation (relative combustion efficiency) measure calculation system 200 to derive a pressure torque measure ($CA_k$) and a pressure torque fluctuation (relative combustion efficiency) measure ($IP_k$) for each cylinder in engine 198. A speed calculation system 202 uses the crankshaft angular positions $\theta_1 - \theta_4$ to calculate the mean engine speed, $\overline{S}$, to generate a reference to top dead center, $\theta_{TDCk}$, and to index the cylinder position in the firing order, $CYL_k$, fuel parameter (in this case, injection timing) system 204 determines the optimum fuel injection timing for each cylinder in engine 198 based on the pressure torque measure ($CA_k$), the relative combustion efficiency measure ($IP_k$) and the mean engine speed, $\overline{S}$. The cylinder index, $CYL_k$, mean engine speed, $\overline{S}$, and top dead center reference, $\theta_{TDFCk}$, are used to time the fuel injection signal, $V_{FPk}$, transmitted to the fuel distribution system 206 to assure the proper fuel injection timing to each cylinder.

It should be noted that the fuel system parameter $FP_k$ controlled could also be fuel amount injected (controlled, for example by injector nozzle open time or fuel system pressure adjustment), or some combination of fuel injection timing and amount of fuel injected.

Using the four degree of freedom elastic model of the engine-drivetrain system, and considering the input to be measured speed fluctuations at an appropriate number of stations, the engine total torque and pressure torque fluctuation waveforms can be obtained, as well as the pressure torque and cylinder pressure waveforms. Knowledge of the speed fluctuation at one station is required if the load torque is essentially constant over the firing interval If load torque varies on the same general time scale as engine torque does, knowledge of the speed fluctuations at two stations is required. In general, speed fluctuation data is required at as many stations as there are fluctuating inputs.

Possible control applications of the sensing method include: (1) use of engine pressure torque and engine speed in a look-up table configuration similar to present day manifold air pressure detection systems. For this application the torque sensor output might be calibrated so that pressure torque fluctuation amplitude is related to mean engine torque; (2) use of the pressure torque or pressure torque fluctuation waveform and/or the pressure waveform to implement adaptive engine control. It is well known that for a given fuel metering level, the optimum spark advance over a wide range of conditions leads to a pressure buildup in the cylinder such that the peak pressure is at a relatively fixed location after TDC. Peak pressure location thus can be used directly or transformed into a corresponding pressure torque fluctuation criterion, yielding a closed loop adaptive spark advance control; (3) on-line identification of faulty cylinders and associated components. One of the main advantages of this process is its ability to identify the pressure torque contribution of each cylinder and the pressure that caused it. This makes it possible to monitor and control each cylinder individually. Related applications include knock detection and lean limit control of lean burn engines; (4) idle speed control. Typically the desire for idle speed control is to lower the speed to a speed below which the engine runs unacceptably rough. Rough running implies uneven cylinder-by-cylinder torque production. This information is exactly what is provided by the process herein disclosed; and, (5) driveline torque control This is an area of much current interest. Torque measurement is a very desirable input for transmission control and can make possible improved shift logic, enhanced vehicle performance and better driveability.

What is claimed is:

1. A method of generating a signal related to the fluctuation of the pressure component of the torque or the mean engine torque or the engine pressure torque or the cylinder pressure produced by an internal combustion engine coupled through a drivetrain to a load, the method comprising the steps of determining the rate of rotation of a component of the engine-drivetrain-load combination and generating a first signal related thereto, determining the inertial component of the torque produced by the engine and generating a second signal related thereto, and combining the first and second signals to provide the desired signal 2. The method of claim 1 wherein the engine-drivetrain-load combination comprises an engine vibration damper and the step of determining the rate of rotation of a component of the engine-drivetrain-load combination comprises the step of determining the rate of rotation of the engine vibration damper.

3. The method of claim 1 wherein the engine comprises a crankshaft and the step of determining the rate of rotation of a component of the engine-drivetrain-load combination comprises the step of determining the rate of rotation of the crankshaft at the engine.

4. The method of claim 1 wherein the engine-drivetrain-load combination comprises a flywheel, and the step of determining the rate of rotation of a component of the engine-drivetrain-load combination comprises the step of determining the rate of rotation of the flywheel.

5. The method of claim 4 wherein the flywheel comprises a ring gear and the step of determining the rate of rotation of the flywheel comprises the steps of generating clock pulses at a uniform frequency and counting the number of such clock pulses between passage of adjacent teeth of the ring gear past a fixed point.

6. The method of claim 1 wherein the step of determining the rate of rotation of a component of the engine-drivetrain-load combination comprises the step of determining the rate of rotation at the load.

7. The method of claim 1 wherein the load is characterized by a load torque which fluctuates on the same general time scale as the engine torque, the method further comprising the steps of determining the rate of rotation of a second component of the engine-drivetrain-load combination and generating a third signal related to the load torque therefrom.

8. The method of claim 7 wherein the engine-drivetrain-load combination comprises an engine vibration damper and the step of determining the rate of rotation of a second component of the engine-drivetrain-load combination comprises the step of determining the rate of rotation of the engine vibration damper.

9. The method of claim 7 wherein the engine comprises a crankshaft and the step of determining the rate of rotation of a second component of the engine-drivetrain-load combination comprises the step of determining the rate of rotation of the crankshaft at the engine.

10. The method of claim 7 wherein the engine-drivetrain-load combination comprises a flywheel, and the step of determining the rate of rotation of a second component of the engine-drivetrain-load combination comprises the step of determining the rate of rotation of the flywheel.

11. The method of claim 10 wherein the flywheel comprises a ring gear and the step of determining the rate of rotation of the flywheel comprises the steps of generating clock pulses at a uniform frequency and counting the number of such clock pulses between passage of adjacent teeth of the ring gear past a fixed point.

12. The method of claim 7 wherein the step of determining the rate of rotation of a second component of the engine-drivetrain-load combination comprises the step of determining the rate of rotation at the load.

13. A method of producing a signal related to the fluctuation of the pressure component of the torque or the mean engine torque, or the engine pressure torque, or the cylinder pressure produced by an internal combustion engine, the method comprising the steps of measuring the rate of rotation of an engine component and generating a first signal related thereto, determining the inertial component of the torque produced by the engine and generating a second signal related thereto, and combining the first and second signals to provide the desired signal.

14. A method of producing a signal related to the fluctuation of the pressure component of the torque, or the mean engine torque, or the engine pressure torque, or the cylinder pressure produced by an internal combustion engine, the method comprising the steps of measuring the rate of rotation of a driven component to which the engine is coupled and generating a first signal related thereto, determining the inertial component of the torque produced by the engine and generating a second signal related thereto, and combining the first and second signals to provide the desired signal.

* * * * *